UNITED STATES PATENT OFFICE.

HANS HOLZER, OF FRANKFORT-ON-THE-MAIN, GERMANY.

PROCESS FOR PREPARING BEER.

983,998. Specification of Letters Patent. Patented Feb. 14, 1911.

No Drawing. Application filed March 19, 1910. Serial No. 550,444.

*To all whom it may concern:*

Be it known that I, HANS HOLZER, a subject of the German Emperor, and resident of Frankfort-on-the-Main, Germany, have invented a certain new and useful Process for Preparing Beer, of which the following is a specification.

The kava plant (*Piper methysticum*) grows in the South Sea Islands and has more especially in its root quite a number of eminent properties and this to such a degree that well known pharmacologists repeatedly have raised the question if it would not be possible to utilize this plant in any manner in the old world. The said eminent properties of the kava plant mainly consists in the thirst quenching, tonic and diuretic effect. Besides it forms like hops an inoffensive narcotic. Now, minute chemical investigation has shown that the kava plant contains nearly the same chemical components as the hops and has suggested the idea to employ kava in beer breweries not with a view of replacing the hops but with a view of giving the beer new properties *i. e.* thirst quenching, tonic and diuretic properties which until now could not be found at all or at least in a feeble degree in the beer. The numerous experiments made have besides shown that the kava plant is like hops an excellent means for preventing lactic fermentation during the process of brewing. The above cited eminent properties of the kava plant are based on the percentage of kavain and kava rosins. The experiments have shown besides that the ground kava may be added during the operation of mashing as well as during the boiling of the wort, or may be added to the beer in a cold state, before or after the fermentation.

My invention involves the use of extracts of the kava plant; and these extracts are preferably obtained by first grinding the kava; but I do not limit my invention to this specific method.

The beer brewed in this manner, is distinguished from other beers by its very thirst quenching, spirit and body refreshing as well as diuretic effect.

Having now fully described my said invention what I claim and desire to secure by Letters Patent, is:—

1. A process for preparing beer consisting in adding to the beer kava during the operation of mashing and the boiling of the wort for the purpose specified.

2. A process for preparing beer consisting in adding to the beer extracts of the kava plant for the purpose specified.

In testimony whereof I have hereunto set my hand in presence of two witnesses.

HANS HOLZER.

Witnesses:
 JEAN GRUND,
 CARL GRUND.